United States Patent
Wood et al.

(10) Patent No.: US 6,793,129 B2
(45) Date of Patent: Sep. 21, 2004

(54) STUDY AID APPARATUS AND METHOD OF USING STUDY AID APPARATUS

(75) Inventors: Michael C. Wood, Orinda, CA (US); Kelly Chapman, Foster City, CA (US); Christa McClintock, San Francisco, CA (US); Ann F. Earp, San Francisco, CA (US); Andrew B. Hartzell, Emeryville, CA (US); Matthew P. Fishbach, Piedmont, CA (US)

(73) Assignee: LeapFrog Enterprises, Inc., Emeryville, CA (US)

(*) Notice: Subject to any disclaimer, the term of this patent is extended or adjusted under 35 U.S.C. 154(b) by 0 days.

(21) Appl. No.: 10/218,688

(22) Filed: Aug. 12, 2002

(65) Prior Publication Data

US 2003/0077558 A1 Apr. 24, 2003

Related U.S. Application Data

(60) Provisional application No. 60/347,783, filed on Jan. 9, 2002, and provisional application No. 60/313,104, filed on Aug. 17, 2001.

(51) Int. Cl.[7] .............................. G06F 17/00; G09B 7/00
(52) U.S. Cl. ...................... 235/375; 434/322; 434/323
(58) Field of Search ..................... 235/375; 434/322, 434/308, 309, 336, 317, 307, 335

(56) References Cited

U.S. PATENT DOCUMENTS

| | | |
|---|---|---|
| 4,303,398 A | 12/1981 | Yoseloff |
| 4,383,307 A | 5/1983 | Gibson, III |
| 4,411,628 A | 10/1983 | Laughon et al. |
| 4,611,996 A | 9/1986 | Stoner |
| 4,654,818 A | 3/1987 | Wetterau, Jr. |
| 4,820,167 A | 4/1989 | Nobles et al. |
| 5,035,625 A | 7/1991 | Munson et al. |
| 5,184,830 A | 2/1993 | Okada et al. |
| 5,379,213 A | 1/1995 | Derks |
| 5,407,357 A | 4/1995 | Cutler |
| 5,586,889 A | 12/1996 | Goodman |
| 5,632,624 A | 5/1997 | Cameron et al. |
| 5,813,861 A | 9/1998 | Wood |
| 5,847,698 A | 12/1998 | Reavey et al. |
| 5,904,485 A | 5/1999 | Siefert |
| 5,944,533 A | 8/1999 | Wood |
| 5,961,333 A | 10/1999 | Harrison et al. |
| 5,997,304 A | 12/1999 | Wood |
| 6,142,784 A | 11/2000 | Wood |
| 6,210,272 B1 * | 4/2001 | Brown .......................... 463/1 |
| 6,356,287 B1 * | 3/2002 | Ruberry et al. ............. 345/864 |

OTHER PUBLICATIONS

Nintendo original Game Boy image (http://www.studio42.com/).*

(List continued on next page.)

*Primary Examiner*—Karl D. Frech
*Assistant Examiner*—Daniel A. Hess
(74) *Attorney, Agent, or Firm*—Townsend and Townsend and Crew LLP

(57) ABSTRACT

A method of using a study aid apparatus is disclosed. The method includes receiving supplemental information associated with a printed textbook. After receiving the supplemental information, it can be loaded into a portable, study aid apparatus. The study aid apparatus is then used to help learn about subject matter in the textbook.

20 Claims, 6 Drawing Sheets

OTHER PUBLICATIONS

"An Overview of Sesame Street: Elmo's 123S" Internet product review. http://rottentomatoes.com/g/SesameStreetElmos123s–701752/overview.php.*

"Packy And Marlon—Health Hero (US)" Internet product review. http://www.screenmania.retrogames.com/snes/01/snes_0048.html.*

Web page: "Berlitz Spanish for Game Boy Color:"*Abacci GameBoy Gar*; at URL=http://www.abacci.com/gameboy/game.aspx?gameID=13268&genreID=1, printed Mar. 17, 2004: 2 pages.

Web page: "GameBoy Color Educational Games;" *Abacci GameBoy Gar*; at URL=http://abacci.com/gameboy/genre.aspx?GenreID=1; printed Apr. 2, 2004; 1 page.

Web page: "Sesame Street: Elmo's 123s for Game Boy Color," *Abacci GameBoy Gar*, at URL=http://abacci.com/gameboy/game.aspx?gameID=1369&genreID=1; printed Apr. 2, 2004; 5 pages.

Web page: at URL=http://ntraulanen.fl/computers/other/images/snes_euro_pad.jpg; 1 page.

* cited by examiner

Chapter 4
Questions 1-5 are each worth 7 points
Questions 6-13 are each worth 8 points

| Total Points | 100 |
|---|---|
| Your Score | - |

Part A *Match the statements with the words.*

___ 1. Charge on an atom that has lost electrons.     a. lightning
___ 2. Electric charge built up in one place.     b. negative    200
___ 3. An example of static discharge.     c. positive
___ 4. Charge on an atom that has gained electrons.     d. like
___ 5. Static electric charges that repel on another.     e. static electricity

Part B *Select the letter of the comet answer in the blank.*

6. Current electricity is the flow of ___ through a material.
        a. electrons       c. static
        b. protons        d. neutrons 7. Materials through which electrons flow easily are
        a. insulators       c. switches
        b. conductors     d. nonmetals 8. Continuous conducting paths over which electrons move are called
        a. fuses          c. switches
        b. breakers       d. circuits 9. In what kind of circuit does current flow through more than one pathway?
        a. magnetic       c. series
        b. open           d. parallel 10. A ___ is a safety device in which melting a metal strip breaks a circuit.
        a. switch         c. kilowatt-hour
        b. fuse           d. circuit breaker 11. What unit is used to measure power?
        a. watt           c. volt
        b. newton       d. kilowatt-hour 12. How much would it cost to use a 100-watt light bulb for 30 hours, if electricity costs 15 cents for each kilowatt-hour?
        a. $20.00        c. $0.45
        b. $0.20         d. $0.50

13. What causes the coil in an electric motor to turn?
             a. the motion of the shaft attached to the coil
             b. heat produced by electrons flowing through electrical wires
             c. a force produced by the interaction of two magnetic fields
             d. static electricity built up in the coil

FIG. 5

STUDY AID APPARATUS AND METHOD OF USING STUDY AID APPARATUS

CROSS-REFERENCE TO RELATED APPLICATIONS

This U.S. non-provisional application claims the benefit of the filing dates of U.S. provisional patent application Nos. 60/313,104, filed Aug. 17, 2001, and 60/347,783, filed Jan. 9, 2002. These provisional applications and any U.S. patents or patent applications mentioned below are herein incorporated by reference in their entirety for all purposes.

BACKGROUND OF THE INVENTION

Public school systems have operated in substantially the same manner for many years. A student, particularly from middle school on, uses at least one printed textbook for each major subject that the student is studying.

Among the various proposals to improve the education process, some have proposed replacing printed textbooks with electronic textbooks. Among the stated advantages of doing so, using electronic textbooks in place of printed textbooks reduces the costs associated with printing and allows for rapid updating of the textbooks. While these advantages are desirable, printed textbooks are still widely used in schools despite the ever increasing use of electronics in peoples' daily lives. Unlike electronic textbooks, printed textbooks are often easier to read than electronic textbooks, because printed pages have less glare than display screens. Printed pages also have better resolution and contrast than display screens. Also, a student can more easily tab the pages in the textbook than the screens in an electronic textbook. A printed textbook can consequently be easier to review than an electronic textbook. For these and other reasons, printed textbooks are likely to remain in schools for some time to come.

However, using printed textbooks alone has a number of disadvantages. For instance, many of the printed questions at the end of a specific chapter in a textbook may not truly test a person's comprehension of the subject matter in the chapter. A student can have a desire or tendency to "peek" at the questions and possibly the answers at the end of a chapter in a textbook before they have actually fully read the chapter. Although such questions are meant to be "fresh" questions that are presented to the student after the student is done reading a particular chapter, the questions may not in fact be fresh questions to the user. Consequently, after the user reads the chapter and answers the questions, the results obtained may not be an accurate indication of the student's true understanding the subject matter in the chapter. Also, while the printed questions test a student's understanding of the subject matter in a chapter in a textbook, the questions may quickly become untimely. Questions and subject matter in a science book, for example, can be readily outdated due to changing current events. Moreover, printed textbooks also have only a limited number of questions at the end of each chapter. Once a user attempts the questions at the end of a chapter in a printed textbook, there are no more questions available for a user to try. The user's ability to prepare for an upcoming exam can be limited by the number of available questions in the printed textbook. Lastly, it is difficult for a user to record his performance using paper alone. When using only a printed textbook, a user would essentially have to manually record the number of questions that were successfully answered after doing each self-test. This is cumbersome and the user is unlikely to do this.

It would be desirable to retain the use of printed textbooks, while using electronics technology to address the deficiencies of printed textbooks.

SUMMARY OF THE INVENTION

Embodiments of the invention relate to study aid apparatuses, methods of using the study aid apparatuses and systems using the study aid apparatuses.

One embodiment of the invention is directed to a method of using a study aid apparatus, the method comprising: a) receiving supplemental information associated with a printed textbook; b) loading the supplemental information into a portable, study aid apparatus; and c) using the portable, study aid apparatus to help learn about subject matter in the textbook.

Another embodiment of the invention is directed to a portable, study aid apparatus for use in a system including the portable, study aid apparatus and a printed textbook, the portable, study aid apparatus comprising: a) a housing; b) a processor in the housing; c) an audio device for providing supplemental information associated with the printed textbook to the user in audio form, wherein the audio device is coupled to the processor; d) a memory for storing the supplemental information and being coupled to the processor; and e) an input device coupled to the processor.

Another embodiment of the invention is directed to a method for providing supplemental information for a printed textbook to a user, the method comprising: a) receiving supplemental information for a plurality of printed textbooks; b) storing the supplemental information for the plurality of textbooks in a database; and c) sending the supplemental information to a user via the Internet, wherein the supplemental information is to be loaded into a portable, study aid apparatus that is to be used with the printed textbook.

Systems including the above-described methods and study aid apparatuses are also disclosed.

These and other embodiments of the invention are described in further detail below with reference to the foregoing drawings and detailed description.

BRIEF DESCRIPTION OF THE DRAWINGS

FIG. 5 shows exemplary display that could be displayed to a user when using a study aid apparatus according to an embodiment of the invention.

DETAILED DESCRIPTION

Figures 1A, 1B:
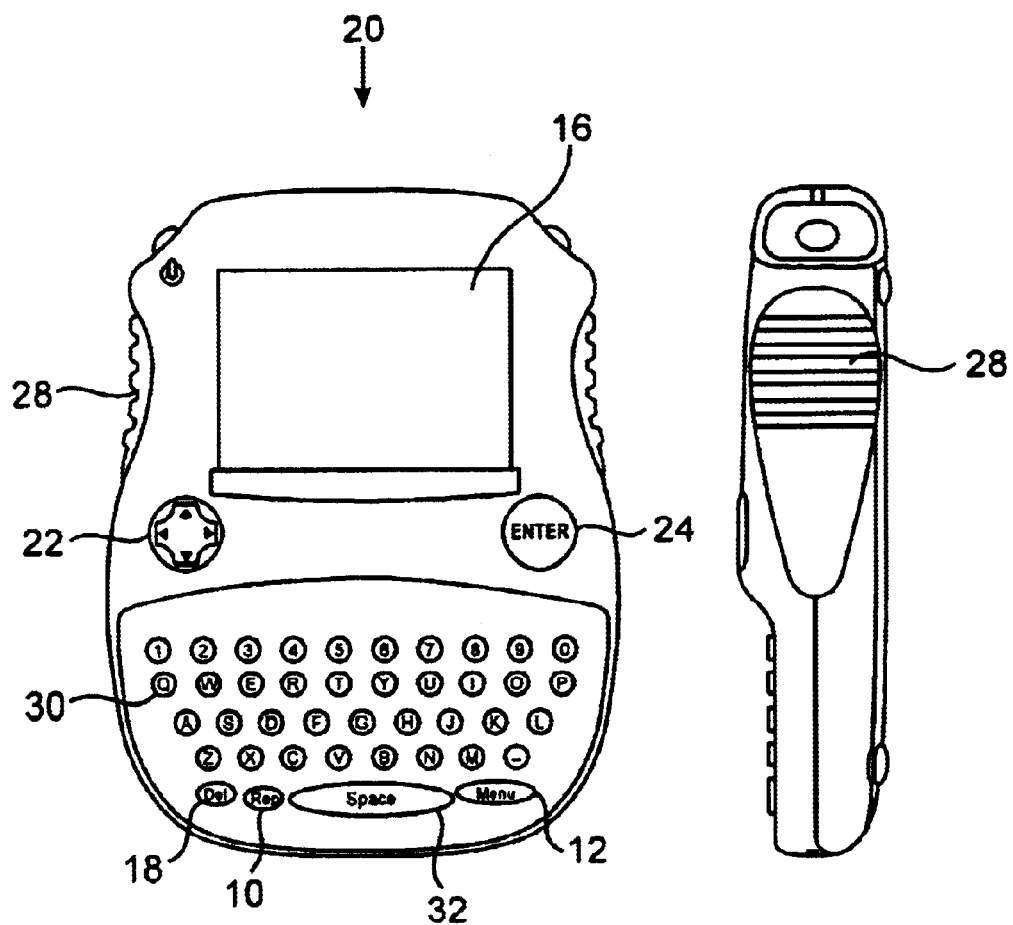
FIG. 1(a) shows a front view of a study aid apparatus according to an embodiment of the invention.
FIG. 1(b) shows a side view of a study aid apparatus according to an embodiment of the invention.

One embodiment of the invention is directed to a method of using a portable, study aid apparatus. The method includes receiving supplemental information associated with a printed textbook (such as an academic textbook). Preferably, the supplemental information is received by a user from a server computer that is accessible through the Internet. The supplemental information supplements subject matter that is in a printed textbook that is used in a school such as a middle school, high school, college, or university.

For example, the supplemental information may comprise multiple choice questions that pertain to chapter-specific subject matter in a textbook that the user is using.

After receiving the supplemental information, it is loaded into a portable, study aid apparatus. In some embodiments, the supplemental information may be transferred to a transferable information storage medium such as a data cartridge. The data cartridge can be inserted into the portable study aid apparatus to load the supplemental information into the study aid apparatus.

A user then uses the portable, study aid apparatus to help learn about subject matter in the textbook. When using the portable, study aid apparatus, the supplemental information can be presented to the user in audio and/or visual form. In some embodiments, a speech synthesizer within the study aid apparatus can ask the user a question that is simultaneously displayed on a screen in the study aid apparatus. The dialog for the question may be pre-recorded dialog. The question and other questions can be used to test the user's understanding of the subject matter in a textbook. The user can use the supplemental information to help prepare for a future exam, or simply learn about subject matter in a textbook.

In embodiments of the invention, the user of the portable, study aid apparatus is typically a student such as a middle school student (e.g., about ages 10–13, or about grades 6 to 8). The user could also be a high-school student, college student, graduate student, or even a student that is younger than a typical middle school student.

The supplemental information may be any suitable information that supplements a conventional printed textbook. Conventional printed textbooks include those that are produced by such well-known textbook publishers such as Houghton Mifflin, McGraw-Hill, Harcourt and Prentice-Hall. Examples of supplemental information include questions about the subject matter in a specific chapter in a textbook, audio segments that may supplement subject matter in a textbook, or visual segments that may supplement printed subject matter in a textbook. For example, images, video segments, or audio segments can be used to supplement subject matter in a textbook. In a typical illustration, an audio segment of a famous speech by a famous politician can be presented to the user by the study aid apparatus to supplement text material about the politician in a printed textbook. However, preferably, the supplemental information comprises chapter-specific questions (or other test material) analogous to those found at the end of chapters in conventional printed textbooks. Examples of questions include multiple choice questions, fill-in-the-blank questions, true-false questions, and matching questions. In embodiments of the invention, a set of such chapter-specific questions (e.g., 10 or more) can be presented to the user in the form of a pop quiz or chapter review. In other embodiments, the supplemental information may include supplementary chapter outlines for the textbooks. Each outline can cover key topics, definitions, concepts, and events discussed in a textbook. These supplementary outlines (or other supplemental information) can be printed along with downloaded chapter questions with an appropriate computer and printer.

The printed textbooks and the supplemental information may teach the user any suitable subject. Suitable subjects include science (life, earth, and physical science), math (computational skills, early algebra, geometry), social studies (U.S. and world history, geography, anthropology), vocabulary, foreign languages, grammar, language arts (e.g., English), music, etc. In embodiments of the invention, a single study aid apparatus can be used to provide supplemental information relating to many chapters in many different types of textbooks to the user. For example, in some embodiments, one study aid apparatus could contain supplemental questions for different chapters in six textbooks for six different courses being taken by the user.

Embodiments of the invention advantageously retain the benefits of printed textbooks while addressing many of the deficiencies of printed textbooks. For example, because pages of questions can be electronically stored in the study aid apparatus, a user does not have the ability to "peek" at the questions before reading a chapter in a textbook. Accordingly, when the user is presented with the questions, they are fresh and test the user's true understanding of the subject matter in the textbook. Also, in embodiments of the invention, the study aid apparatus can be readily updated with questions that are timely and also interesting to the user. For example, algebra problems that include fact patterns pertaining to current, local sports teams or sports figures could be presented to the user. In another example, the study aid apparatus can present audio segments of current events to the user to supplement textbooks for social studies courses. Furthermore, in embodiments of the invention, sets of questions can be downloaded from one or more server computers via the Internet. The user can have access to literally hundreds or thousands of questions for a textbook, instead of just a few questions. Consequently, the user's ability to prepare for an upcoming exam is not limited by the number of available questions. Lastly, in embodiments of the invention, after reading a chapter in a textbook, the study aid apparatus can automatically record the user's score after presenting the user with a pop quiz (e.g., where the user is quizzed to see how many randomized questions they can correctly answer in a predetermined amount of time) or a chapter challenge (e.g., where after selecting a subject such as math, science, or social studies and a specific textbook chapter, the user is asked a series of questions that can be answered in, for example, a multiple choice format). After taking the pop quiz or chapter challenge, the study aid apparatus may display the user's score. If the user is not satisfied with the score, the user can then re-review the chapter and take another pop quiz or chapter challenge. Scores can be recorded over time and the user can track any progress being made. Because the scores can be recorded electronically in embodiments of the invention, the user need not take the time to manually tabulate scores to determine if progress is being made. Also, the pop quiz feature of the study aid apparatus allows a user to simulate actual test conditions for a test that the user may take in the future.

Embodiments of the invention provide fun and engaging ways to teach subjects to the user and helps the user prepare for tests. There is a need among students in particular, for an apparatus that can help them learn what they are studying and how it is being taught. By providing chapter specific content based on a printed textbook used in the classroom, the study aid apparatus can help the user learn what they need to know to perform well on tests and quizzes.

FIG. 1 shows a frontal view of a study aid apparatus 20 according to an embodiment of the invention. The study aid apparatus 20 is a hand-held apparatus that is portable and is preferably ergonomically shaped. Exemplary dimensions can be 4"×6"×1". Because the study aid apparatus 20 is portable, it can be used by the user at any suitable location. For example, the study aid apparatus 20 can be used while the user is on a bus, waiting for a bus, at school (e.g., in the classroom or in the cafeteria), at home, in the car, etc. To help grip the study aid apparatus 20, a grippable plastic material 28 with ridges can be included on the sides of the study aid apparatus 20. The remaining body of the study aid apparatus may include a hard plastic material. A better view of the grippable plastic material 28 is shown in FIG. 1(b).

The study aid apparatus 20 includes a number of input devices. The input devices include an alphanumeric keyboard 30 wherein the letters are on buttons in a QWERTY format. Other buttons include a Delete button 18 (to delete a question), a Repeat button 10 (to repeat a presented question), and an Enter button 24. A space bar 32 and a Menu button 12 are also included in the study aid apparatus 20. Other input devices including on-off buttons (not shown) and volume controls (not shown) may also be included in the study aid apparatus 20. A directional input device 22 such as a joystick, touchpad or a directional button can also be included in the study aid apparatus 20 to move an element such as a cursor or pointer displayed on an LCD screen 16 above the keyboard 30. One can also scroll through choices in a menu using the directional input device 22. Also, in some embodiments, a switchable faceplate for the keyboard 30 may be provided to provide the user with a different user interface.

In addition to the LCD screen 16, output devices such as a speaker and an audio jack can also be provided in the embodiment shown in FIG. 1(a). These output devices could be located at side regions of the study aid apparatus 20. For example, an audio jack could be provided on the bottom side region of the apparatus 20 under the space bar 32.

Figure 2:
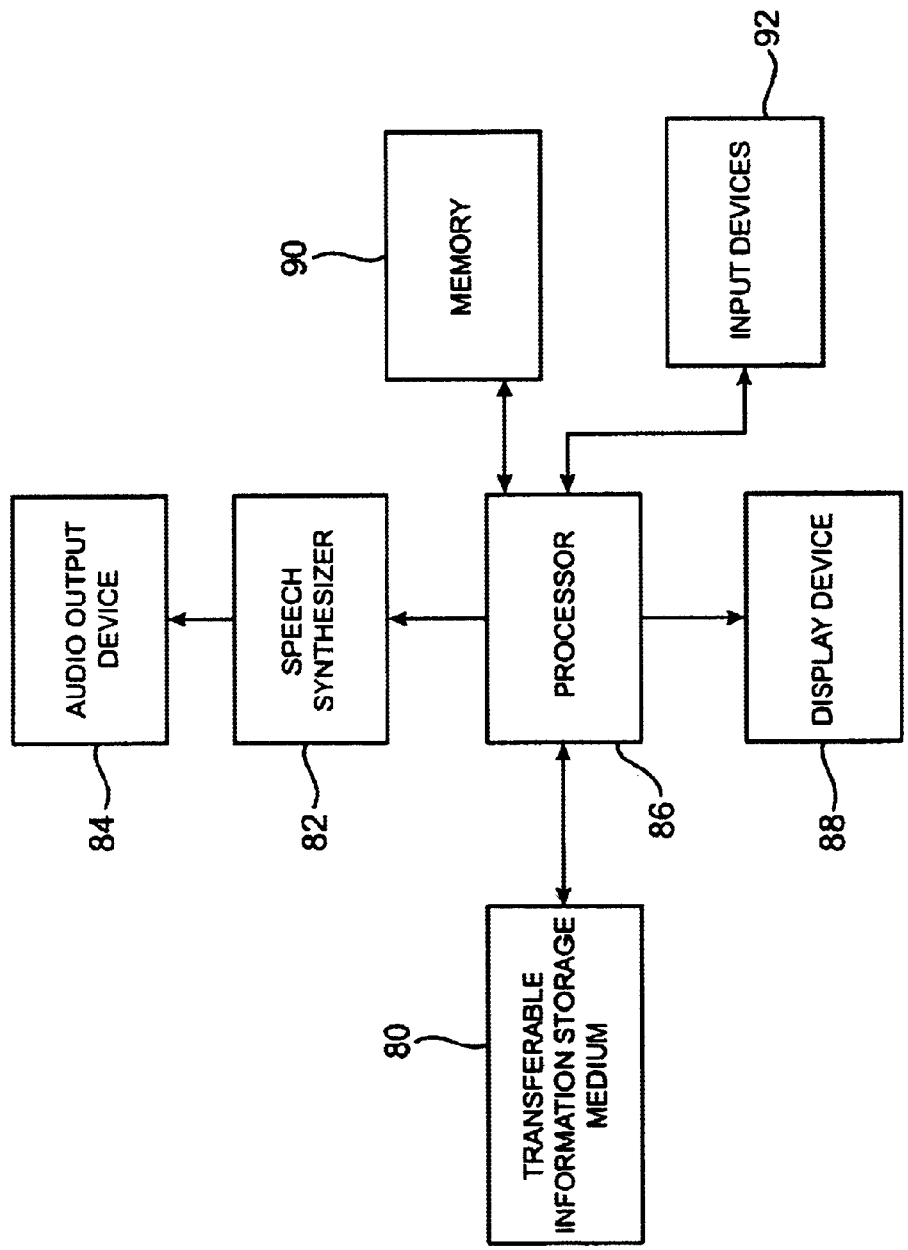
FIG. 2 shows a block diagram of some components of a study aid apparatus according to an embodiment of the invention.

FIG. 2 shows a block diagram of some components of the study aid apparatus. The study aid apparatus may comprise a processor 86 such as a microprocessor. A memory 90, an input device 92, a speech synthesizer 82, an audio output device 84, and a display device 88 may each be coupled (directly or indirectly) to the processor 86. Typically, power is supplied to the study aid apparatus using standard disposable or rechargeable batteries (e.g., size AA batteries). In addition, the study aid apparatus may include an automatic shut off feature that shuts off the apparatus if the user does not interact with it in a predetermined period of time.

Any suitable input device 92 may be included in the study aid apparatus. For instance, one or more of buttons, levers, speech recognition devices, alpha-numeric keypads, space-bars, etc. can be included in the study aid apparatus. As noted above, one input device can be a menu button that allows a user to choose a subject area, or play mode of interest. A menu of options may be presented to the user after the user presses the "menu" button. The user may scroll through and/or select options using the directional input device 22 and the Enter button 24. Another button that can be provided on the interactive apparatus is a "repeat" button that the user can press to cause the interactive apparatus to repeat the question asked. An "enter" button can be provided for the user to enter a selection. Also, a "delete" button can also be provided for the user to delete a question. Buttons in the study aid apparatus can be specifically designated to accomplish these functions.

The memory 90 may be any suitable temporary or permanent information storage device. For example, the memory 90 may include one or more of optical, magnetic, or electronic storage media such as optical or magnetic disks, tapes, sticks, and the like. Storage devices such as these may be used alone or in combination to make up the memory 90. Any suitable number of RAM (random access memory), ROM (read only memory) and EPROM (erasable programmable memory) chips may also be included in the memory 90. In some embodiments, the ROM can include a memory storage capacity of about 2 MB (megabytes) or more, although the storage capacity is likely to change as data storage technology improves.

Since the study aid apparatus will typically be used by students, computer code for a number of other features may be desirably stored in the ROM or EPROM in the memory 90. For example, software for a scheduler, games, address book, dictionary (e.g., a Merriam-Webster™ Dictionary with over 40,000 entries), calculator, and edit/spell-checker may be included in the study aid apparatus. In addition, code for displaying e-mails (e.g., e-mail reminders to the user or from the user's parents) may be included so that the user can read e-mails on the study aid apparatus. Other types of computer code or software such as text-to-speech converter programs or code for music or playing music can be included in the memory of the study aid apparatus. As another function, the study aid apparatus may be capable of storing crib notes that the student may use. Advantageously, the study aid apparatus embodiments have many of the functions that a student needs in school. Accordingly, the student can carry only one study aid apparatus to school instead of multiple electronic devices.

The memory 90 can also store the supplemental information for the user, before it is presented to the user. The supplemental information may be temporarily stored in the memory 90, or it may be included as non-volatile "base content" with the study aid apparatus. For example, in some embodiments, the memory 90 can store, temporarily or permanently, 1000 or more 6 to $8^{th}$ grade math, science, and social studies questions (questions corresponding to other grade levels can also be used in embodiments of the invention). The memory 90 may also have storage capacity that stores more than eight minutes of speech or music.

The speech synthesizer 82 may be a separate speech synthesizer chip or speech synthesizer circuitry that can be on the same or different chip as the processor 86. Suitable speech synthesizer chips are commercially available.

The audio output device 84 may include a speaker, or an audio jack or connection for a headphone or an earphone. An audio amplifier (not shown) may amplify any signals to the audio output device 84. In some embodiments, the audio output device 84 may include an audio jack. In these embodiments, a user can use headphones so the user can listen to the supplemental information. The supplemental information can be presented to the user when the user is in a classroom, library, or on the bus, without disturbing others in the user's vicinity.

The display device 88 can be any suitable device that can display the supplemental information. Suitable display devices include LEDs (light emitting diodes), LCD (liquid crystal displays), etc. Appropriate driver programs and/or driver chips (e.g., LCD driver chips) can be included in the study aid apparatus to facilitate the function of the display device. For example, in some embodiments, the display device may comprise an LCD screen with 90×64 pixels with a font size of about 7×5 pixels. Of course, the number of pixels and pixel sizes can vary in embodiments of the invention.

The transferable information storage medium 80 may be in any suitable form. For instance, the transferable information storage medium 80 may be a cartridge (e.g., in a flash data cartridge), a disk, a tape, or a memory stick. Cartridges are especially desirable since they can be easily manipulated and handled by children. Any suitable amount of storage space may be provided on the transferable information storage medium. Preferably, the capacity of the information storage medium is at least about 1 megabyte (e.g., 4 megabytes or more). The transferable information storage medium 80 can be used to transfer information such as the supplemental information, the user's performance information, and code for operating the study aid apparatus to and from the memory 90 and the processor 86.

Figure 3:
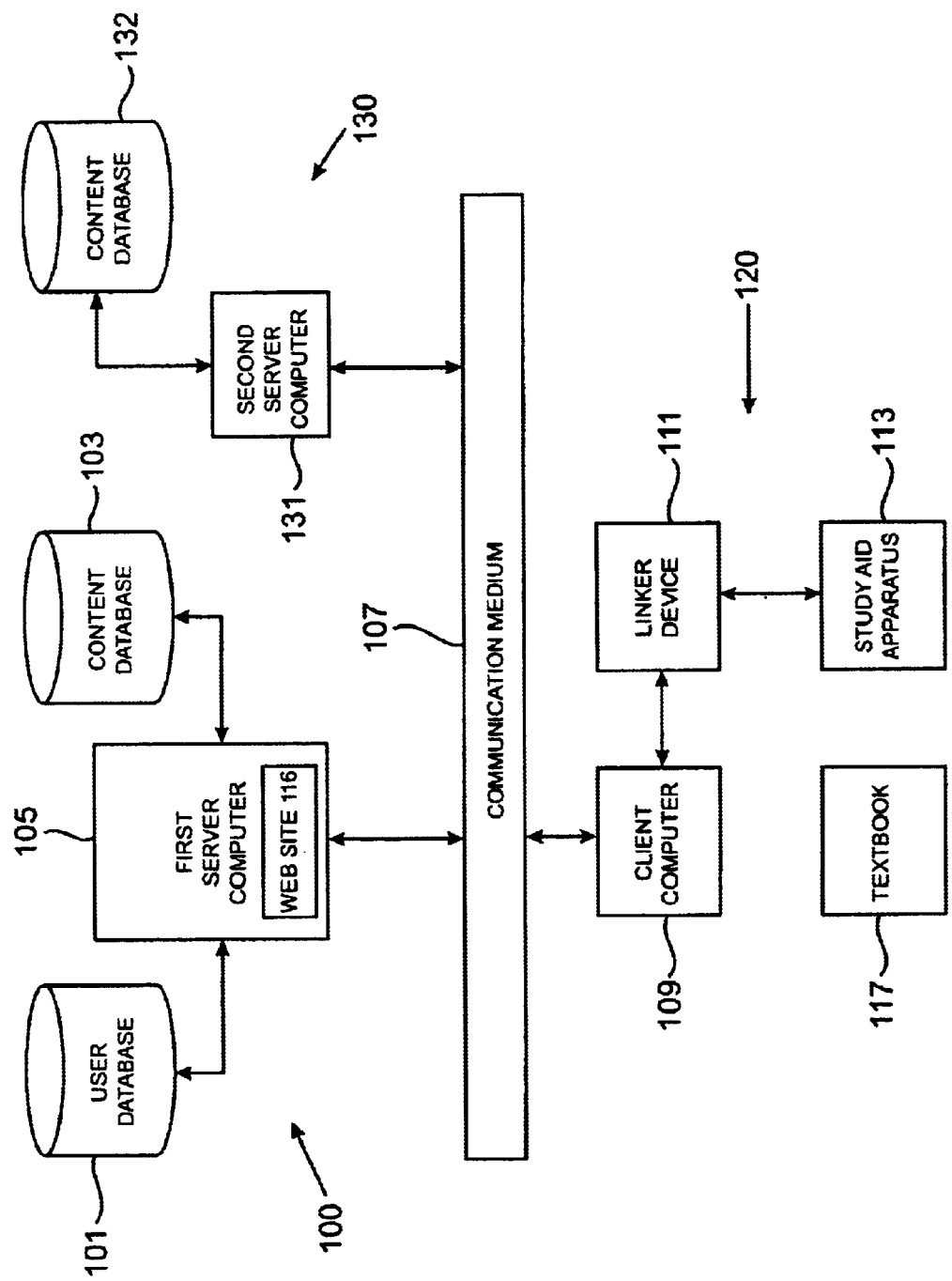
FIG. 3 shows a block diagram of a system according to an embodiment of the invention.

FIG. 3 shows a system according to an embodiment of the invention. The system includes a user site 120, a first host entity site 100 and a second host entity site 130.

The user site 120, the first host entity site 100, and the second host entity site 130 may be in communication with each other through a communication medium 107. One user site is shown for simplicity of illustration. It is understood that there can be many user sites (or host entity sites) in the system. Also, some or all of the components of the illustrated system may be included in embodiments of the invention.

The first host entity site 100 may include a first server computer 105 with a Web site 116 through which the user can register and request content packages. The first server computer 105 can have access to a content database 103, which can store content such as chapter-specific textbook questions. A user database 101 may also be accessed by, and may be coupled to the first server computer 105.

The user database 101 can also include a file for each user of the system.

Each user file can show the textbook chapters completed, previous quiz or self-test scores, and actual test scores. Self-rated scores on real tests at school (e.g., poor, okay, good, great) can also be stored in each user file. Each user file can also include the user's basic information such as the user's name, grade level, subject areas, current school, textbooks used, etc. The user database 101 may also include the user's profile, which may in turn include the user's personal preferences and information about the user. Exemplary user profile information may include information such the user's age, hobbies, address, phone number, e-mail address, school, favorite subjects, relatives, teachers, favorite songs, favorite sports, favorite foods, favorite cartoons, etc. In some embodiments, the user database 101 may also contain a schedule for the user. User schedule information (e.g., a modified schedule) can be uploaded to the server computer and stored in the user database 101.

Individuals such as teachers or parents may also store information pertinent to the user in the user database 101. For example, information such as actual test scores, grades, reminder messages, questions, and supplemental information such as pictures and text for textbooks may be uploaded and stored in the user database 101. This information may reviewed by the user on the Web site 116 or can be downloaded by the user for use in the study aid apparatus.

The content database 103 may include the supplemental information for the textbooks. Such supplemental information can be included in a content package to be sent to the user. The supplemental information may be in the form of static information or dynamic information. For example, the supplemental information may be in the form of sound files (e.g., .WAV files), video files, applications, image files (e.g., JPEG files), or text files (e.g., ASCII type files). In some embodiments, the supplemental information can be in the form of instructions to play code stored in libraries in the memory of the study aid apparatus. Transferring instructions to play code (e.g., MIDI-type code) over a communication medium such as the Internet is faster than transferring code for, for example, all words in an audio segment. Specific types of supplemental information are described above.

The second host entity site 130 may be in communication with both the first host entity site 100 and the user site 120. The second host entity site 130 can also have a second server computer 131 with a Web site (not shown), and a content database 132. The content database 132 operated by the second host entity also stores supplemental information such as chapter-specific textbook questions.

The second host entity may be, for example, the publisher of a textbook that creates its own set of questions and other supplemental information for its own textbooks, while the first host entity may create its own questions for a textbook published by another entity. The user may obtain supplemental information from either the first host entity or the second host entity, and therefore from either content database 103, 132, directly or indirectly. For example, in some embodiments, the second host entity can send questions in its content database 132 to the content database 103 operated by the first host entity so that all questions for the variety of textbooks used by all of the different users can be accessed by the users at one Web site 116. This reduces the burden on the users to search different Web sites for the supplemental information.

At the user site 120, a client computer 109 such as a personal computer can be operatively coupled to a linker device 111. The linker device 111 may be coupled to the client computer 109 through a wireless or a wired link (e.g., a cable). A study aid apparatus 120 may be included in the system and may communicate with the client computer 109 via the linker device 111. Once a content package with supplemental information is loaded into the study aid apparatus 113, it can be uncoupled from the linker device 111 and can be used independently.

The linker device 111 may be any suitable device capable of transferring data between the client computer 109 and the study aid apparatus 113. The linker device 111 could be, for example, a wireless transceiver such as a wireless RF (radio frequency) transceiver or an infrared transceiver. In preferred embodiments, however, the linker device 111 is a device, which is capable of reading information from, and writing information to, the transferable information storage medium. In a typical embodiment, the transferable information storage medium may be a cartridge, which can be inserted into both the linker device 111 and the study aid apparatus 113. Cartridges are desirable, since children are familiar with using cartridges. For instance, many middle school age children are used to using cartridges for video games.

The first server computer 106 includes computer code for a Web site 116 and can be in operative communication with the client computer 109 at the user's site 120. The Web pages of the Web site 116 may include any number of interactive features including any suitable number of hyperlinks to help guide the user through the Web site 116. The Web site 116 may also have a number of graphical user interfaces for the user to input information such as his name, grade, preferences, textbooks used, etc. into the system. A browser on the client computer 109 permits the user or others to view the Web site 116 and pages thereof. Examples of suitable browsers include Internet Explorer™, which is commercially available from Microsoft and Netscape Navigator™.

The server computers 105, 131 can each be a powerful computer or cluster of computers. For example, each of the server computers 105, 131 can be a large mainframe, a minicomputer cluster, or a group of servers functioning as a unit. In one example, the server computer may be a database server coupled to a Web server. Moreover, each of the server computers 105, 131 can behave as a single computer, which services the requests of one or more client computers. Client computers, such as the client computer 109 can communicate with the server computers 105, 131 through the Internet and optionally through one or more Internet Service Providers (ISPs) (not shown). Client computers typically have less memory and less computing power than the server computers 105, 131.

The system, and especially the first server computer 105, can include one or more computer programs, written in any suitable computer language. For example, first, second, and third computer programs used for performing three different functions can be embodied in a single computer program having one or more subroutines, or may be embodied by three separate and distinct computer programs. In embodiments of the invention, for instance, the first server computer 105 may have one or more computer programs to: update the user's information in the user database 101, enter or retrieve supplemental information from the content database 103, or send the supplemental information to the user.

The server computers 105, 131 and the client computer 109 communicate through a communication medium 107 such as the Internet, and more particularly the World Wide Web (WWW). Typical communication protocols used in the communication medium 107 include HTTP (hypertext transfer protocol) and TCP/IP (terminal communication protocol/Internet protocol).

Although the user site 120 includes a study aid apparatus 113, some sites may include a client computer without a corresponding study aid apparatus. For example, a teacher, a parent, or other individual may contact the Web site 116 to view a report relating to a user's performance, or may upload content such as problems, questions, or facts to the Web site 116 so that the content can be included in a content package for the user.

Figure 4:
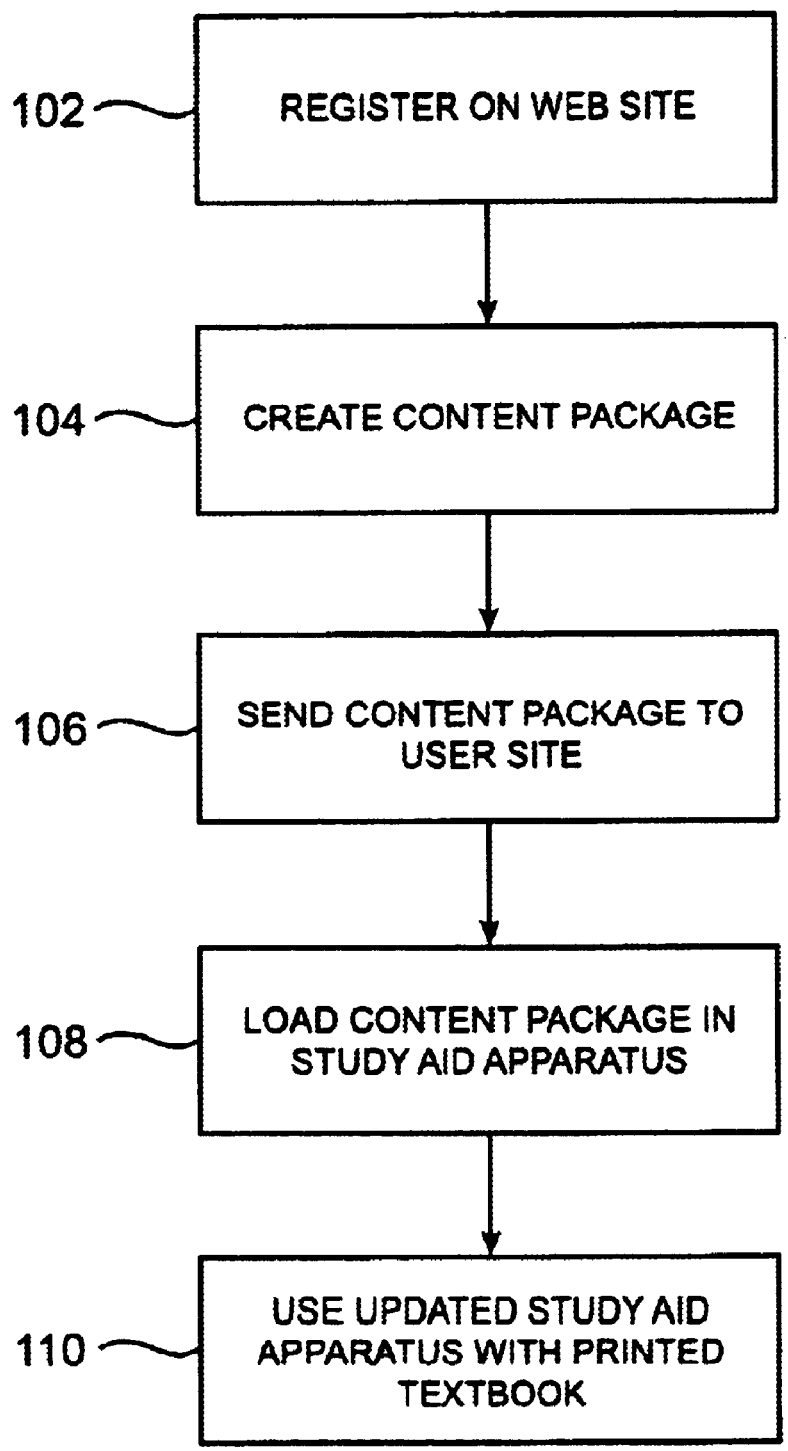
FIG. 4 shows a flow chart illustrating a method according to an embodiment of the invention.

A method of using the system shown in FIG. 3 can be described with reference to FIG. 4. First, using the client computer 109, a user can contact the Web site 116 on the first server computer 105 through the communication medium 107 (e.g., the Internet). Once the user is viewing the Web site 116, the user can register on the Web site 116 (step 102). In a typical registration process, the user's name, grade level, subject areas being studied, textbook information, school, teacher's names, etc. may be input into appropriate Web pages on the Web site 116. The Web site 116 can also contain instructions for installation/setup and programs such as scheduler programs.

In some embodiments, access to the Web site 116 and/or the content in the content database 103 may be subject to a fee. Accordingly, before or after registration, the user or the user's parents may apply for a subscription to the Web site 116. Subscriptions may be for a predetermined period of time (e.g., one year). Once the user is registered, the user (or the user's parents) can access the Web site 116 to obtain, for example, new content on demand, score assessments, achievement certificates, recommendations for prescriptive content packages, and personal best scores.

After the user has registered on the Web site 116, the first server computer 105 can create a content package for the user (step 104). The content package may include a set of chapter-specific questions for each of the textbooks and for each of the chapters that the user is currently using in school. In some embodiments, the first server computer 105 may create the content package at the direction of the user or another person such as a teacher or a student. That is, the user or another person can select questions or sets of questions for chapters and textbooks on the Web site 116 for inclusion in a content package. Alternatively, the first server computer 105 can automatically select specific questions or a set of questions for a content package. The server computer 105 can do this knowing the particular chapter and textbook that the user is current studying. Questions that have already been selected for the user can be marked by the first server computer 105 so that they are not selected for that user again.

After the content package is created, it is sent from the first server computer 105 to the user's client computer 109 (step 106). For example, while visiting the Web site 116, the user can cause the first server computer 105 to send the content package to the user's e-mail account. Once the user accesses the e-mail account, the user may download the content package from the e-mail server. Alternatively, the user may download the content package directly from the first server computer 105 while visiting the Web site 116. In another example, the user can automatically send the content package to the user without a specific prompt. For instance, in some embodiments, the user database 101 and/or the study aid apparatus 113 may contain a scheduler including the user's study schedule for the school term. The scheduler may contain the anticipated date that the user will be finished with a particular chapter in a textbook. Using this information, the first server computer 105 may automatically select a set of questions pertinent to the chapter for user and send it to the user at about the time the user is finished studying the chapter.

Although this example illustrates an embodiment where the user can receive supplemental questions for a printed textbook through a communication medium such as the Internet, the user can receive the supplemental questions in other ways. For example, the supplemental questions (or other supplemental information) can be sold in computer readable media in stores and a user can go to the stores to purchase the computer readable media. For example, the user can purchase a rewritable or non-rewritable data cartridge with questions for a textbook. Some cartridges may have over 1000 questions per cartridge. After purchasing, the user can use the media with the supplemental information with the study aid apparatus. However, the user preferably receives the supplemental information for the study aid apparatus through a communication medium such as the Internet.

In some embodiments, the transferable information storage medium (e.g., data cartridge) with questions may be present with the study aid apparatus as a kit. Accordingly, in these embodiments, the kit may be obtained (e.g., purchased) by a user and the user may use the study aid apparatus immediately, without accessing the Internet. Additional supplemental information may be obtained, for example, by purchasing transferable information media in stores or by downloading new supplemental information from the Internet.

Once the client computer 109 receives the content package, the content package is loaded into the study aid apparatus (step 108). The linker device 111 may be used to accomplish this step. For instance, in some embodiments, the content package can be transferred from the client computer 109 to the linker device 111. The linker device 111 can write computer code for the content package on a data cartridge or other transferable information storage medium (not shown). Once the content package is written onto the data cartridge, the data cartridge can be removed by the user and can be inserted into a slot in the study aid apparatus 113.

A processor in the study aid apparatus 113 can then load the content package into an internal memory or may access the content package stored in the data cartridge.

After the content package is loaded into the study aid apparatus 113, the user may use the study aid apparatus 113 in conjunction with a printed textbook 117 (step 110). The printed textbook 117 and the study aid apparatus 113 can be used at the same or different location. Typically, the user will read a chapter in the printed textbook 117. After reading the chapter, the user may try and answer the questions at the end of the chapter to determine if the user has understood the subject matter in the chapter.

If the user is unsatisfied with the user's command of the subject matter in the chapter, the user may then re-read the chapter and can use the study aid apparatus 113 to test the user's understanding of the subject matter in the re-read chapter. The study aid apparatus 113 can present questions for the chapter to the user in audio and also visual form. Illustratively, the chapter that has just been studied by the user may be a chapter on electricity in a middle school science textbook. Questions, such as those shown in FIG. 5, may be presented to the user in both audio and visual form by the study aid apparatus 113. If the display device in the study aid apparatus 113 is small, fewer questions may be displayed to the user than the number of questions shown in FIG. 5.

As shown in the upper right hand corner of FIG. 5, a score window 200 may be displayed to the user at any suitable time during the testing process. As shown, each question may be worth a certain number of points. The number of points awarded for answering a particular question correctly may depend on the complexity or difficulty of the question. The score window 200 can show the user's score after the user has completed each question or after the user has completed a set of questions. By showing the user's score to the user, the user can track the user's progress to see if, for example, further review of the chapter is needed. In some embodiments, the user's score information can be recorded in the memory in the study aid apparatus 113, and then uploaded to the first server computer 105. The user's score information can then be stored in the user database 101 and the user's scores can be stored in tabular or graphical form to show the user's progress over time. Parents, teachers, or the user may view the progress information. The first server computer 105 may also provide the user with an assessment of the user's performance and may provide additional prescriptive content for the user to use. Accordingly, in embodiments of the invention, the study aid apparatus 113 can be in two-way (or one-way) communication with the first server computer 105.

Figure 6:
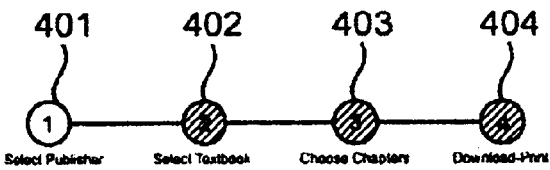
FIG. 6 shows an exemplary Web page.

FIG. 6 shows a Web page on a Web site that can be used in an embodiment of the invention. When visiting the Web site to download new content for the study aid apparatus, the user may select: a "Select Publisher" link 401, a "Select Textbook" link 402, a "Choose Chapters" link 403, and/or a "Download-Print" link 404.

If the user chooses the "Select Publisher" link 401, the user can select a particular subject by selecting a subject link 410. The subject links 410 may be selected by the user to select a particular subject. The user may use the grade link 412 to indicate which grade the user is in, and may also use the publisher link 414 to select the particular publisher of the textbook that the user is using. In this example, the subject links 410, the grade links 412, and the publisher links 414, are in the form of drop-down menus. They could be in the form of other types of links such as static links.

The Web page in FIG. 6 also includes a "Continue" button 422 to continue to the next Web page. It also includes a "View Past Activity Packs" button 420. If the user selects this button, the user can see what content packages the user previously downloaded.

Once the user has filled in the appropriate information on the Web page, the user may select the "Select Textbook" link 402 to select the exact textbooks that the user is using, and then can select the "Choose Chapters" link 403 to select the particular chapters that the user is currently studying.

Once all information about specific textbooks and chapters from one or more different subjects is input into the Web site, the user can download a content package or "activity pack" with, for example, supplemental questions for the textbooks by selecting the "Download-Print" link 404. The user can also download and print chapter outlines of the selected chapters at the user's location by selecting the "Download-Print" link 404. Accordingly, in embodiments of the invention, a user can download a specific content package with chapter specific questions or other information pertaining to various subjects.

While on the Web site, the user may also obtain a progress report. The progress report can give the user feedback such as the subjects and skills reviewed, the next steps for recommending other activity packs, and the time spent using the study aid apparatus.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention. For example, any feature of the study aid apparatus may be combined with any feature of the system shown in, for example, FIG. 3 without departing from the scope of the invention.

What is claimed is:

1. A portable, study aid apparatus for use in a system including the portable, study aid apparatus and a printed textbook, the portable, study aid apparatus comprising:

a) a housing;

b) a processor in the housing;

c) an audio device for providing supplemental information associated with the printed textbook to the user in audio form, wherein the audio device is coupled to the processor;

d) a memory for storing the supplemental information and being coupled to the processor, wherein the supplemental information comprises chapter-specific questions for the printed textbook;

e) an input device coupled to the processor, wherein the input device includes a directional button on the left side or the right side of the front face of the housing for identifying a choice among a list of answers to a particular question;

f) an enter button on the opposite side of the front face of the housing for entering the choice; and g) a display device coupled to the processor and on the front face of the housing.

2. The portable, study aid apparatus of claim 1 wherein the study aid apparatus further comprises a keyboard, and wherein the supplemental information is downloaded from a server computer via the Internet.

3. The portable, study aid apparatus of claim 1 wherein the display device comprises a liquid crystal display device.

4. The portable, study aid apparatus of claim 1 wherein the audio device comprises a speaker.

5. The portable, study aid apparatus of claim 1 further comprising a transferable information storage medium and a slot for the transferable information storage medium.

6. The portable, study aid apparatus of claim 1 further comprising a repeat button for repeating questions presented by the study aid apparatus.

7. A kit comprising:
   the study aid apparatus of claim 1; and
   a transferable information storage medium storing the supplemental information.

8. A system comprising:
   the portable, study aid apparatus of claim 1;
   a server computer;
   a communication medium;
   a client computer coupled to the server computer via the communication medium; and
   a content database comprising the supplemental information coupled to the server computer.

9. A method for providing supplemental information for a printed textbook to a user, the method comprising:
   a) receiving supplemental information for a plurality of printed textbooks;
   b) storing the supplemental information for the plurality of textbooks in a database;
   c) providing for a Website which allows a user to select supplemental information including chapter specific questions associated with a plurality of printed textbooks; and
   d) sending the supplemental information to the user via the Internet, wherein the supplemental information is to be loaded into the portable, study aid apparatus of claim 1.

10. The method of claim 9 wherein sending the supplemental information associated with one or more of the textbooks in the plurality of textbooks to a user includes sending the supplemental information associated with the one or more textbooks in the plurality of textbooks from a server computer to a client computer via the Internet.

11. The method of claim 9 wherein the apparatus comprises a speech synthesizer.

12. The apparatus of claim 1 wherein the supplemental information further comprises supplementary outlines for chapters in the printed textbook.

13. The apparatus of claim 1 wherein the chapter specific questions comprise multiple choice questions.

14. The apparatus of claim 1 wherein the supplemental information comprises chapter specific questions for a plurality of different textbooks.

15. The apparatus of claim 1 wherein the supplemental information comprises a chapter review.

16. The apparatus of claim 1 further comprising a speech synthesizer associated with the processor.

17. A system comprising:
   the study aid apparatus of claim 1; and
   the printed textbook.

18. The study aid apparatus of claim 1 wherein the directional button is on the left side and the enter button is on the right side.

19. The study aid apparatus of claim 1 wherein there is only one directional button in the study aid apparatus.

20. The study aid apparatus of claim 1 wherein the printed textbook includes a math textbook, a science textbook, a language arts textbook, a social studies textbook, or a foreign language textbook.

* * * * *